United States Patent
Park et al.

(10) Patent No.: US 9,346,450 B2
(45) Date of Patent: May 24, 2016

(54) METHOD AND SYSTEM FOR CONTROLLING ENGINE CLUTCH OF HYBRID VEHICLE

(71) Applicants: Hyundai Motor Company, Seoul (KR); Kia Motors Corporation, Seoul (KR)

(72) Inventors: Joonyoung Park, Seoul (KR); Nam Il Choi, Hwaseong-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 21 days.

(21) Appl. No.: 14/098,090

(22) Filed: Dec. 5, 2013

(65) Prior Publication Data

US 2014/0172213 A1   Jun. 19, 2014

(30) Foreign Application Priority Data

Dec. 18, 2012   (KR) .......................... 10-2012-0148811

(51) Int. Cl.
*B60W 10/02* (2006.01)
*B60W 10/06* (2006.01)
*B60W 10/08* (2006.01)
*B60W 20/00* (2006.01)

(52) U.S. Cl.
CPC .............. *B60W 10/02* (2013.01); *B60W 10/06* (2013.01); *B60W 10/08* (2013.01); *B60W 20/40* (2013.01); *B60W 2510/0241* (2013.01); *B60W 2510/0638* (2013.01); *B60W 2510/244* (2013.01); *B60W 2540/10* (2013.01); *B60W 2710/025* (2013.01); *B60W 2710/083* (2013.01); *Y10S 903/93* (2013.01)

(58) Field of Classification Search
CPC .......... B60W 20/30; F16H 2061/0418; F16H 2061/0422
See application file for complete search history.

(56) References Cited

U.S. PATENT DOCUMENTS

| 8,246,506 B2 * | 8/2012 | Matsubara et al. ................ 477/3 |
| 8,485,939 B2 * | 7/2013 | Gluckler et al. ................... 477/5 |
| 2013/0090794 A1 * | 4/2013 | Sung et al. ........................ 701/22 |
| 2013/0225362 A1 * | 8/2013 | Sato ................................. 477/3 |

FOREIGN PATENT DOCUMENTS

| JP | 2008-179283 A | 8/2008 |
| KR | 10-0957331 B1 | 5/2010 |
| KR | 10-1103945 B1 | 1/2012 |

\* cited by examiner

*Primary Examiner* — Todd Melton
(74) *Attorney, Agent, or Firm* — McDermott Will & Emery LLP (57) ABSTRACT

A method and system for controlling an engine clutch of a hybrid vehicle that may effectively select an engagement way of the engine clutch according to a state of the hybrid vehicle and a running state includes: detecting driver's demand torque; calculating sync speed torque that the motor outputs at a predetermined target speed for the sync engagement; detecting a state of charge (SOC) of a battery of the hybrid vehicle; calculate charging torque of an integrated starter-generator (ISG) operated by power of the engine; performing the sync engagement when speed of the motor is greater than the predetermined target speed for the sync engagement; and performing the sync engagement or the launch slip engagement based on the driver's demand torque, the sync speed torque of the motor, the SOC, and the charging torque when speed of the motor is less than the predetermined target speed for the sync engagement.

14 Claims, 11 Drawing Sheets

FIG.1

(Related Art)

METHOD AND SYSTEM FOR CONTROLLING ENGINE CLUTCH OF HYBRID VEHICLE

CROSS-REFERENCE TO RELATED APPLICATION

This application claims priority to and the benefit of Korean Patent Application No. 10-2012-0148811 filed in the Korean Intellectual Property Office on Dec. 18, 2012, the entire contents of which are incorporated herein by reference.

BACKGROUND

1. Technical Field

The present disclosure relates to a method and system for controlling an engine clutch of a hybrid vehicle that may effectively select an engagement way of the engine clutch according to a state of the hybrid vehicle and a running state.

2. Background

Hybrid vehicles operate through the use of power from an internal combustion engine and power from a battery. In particular, hybrid vehicles are designed to efficiently combine and use the power of the internal combustion engine and a motor.

Figure 1:
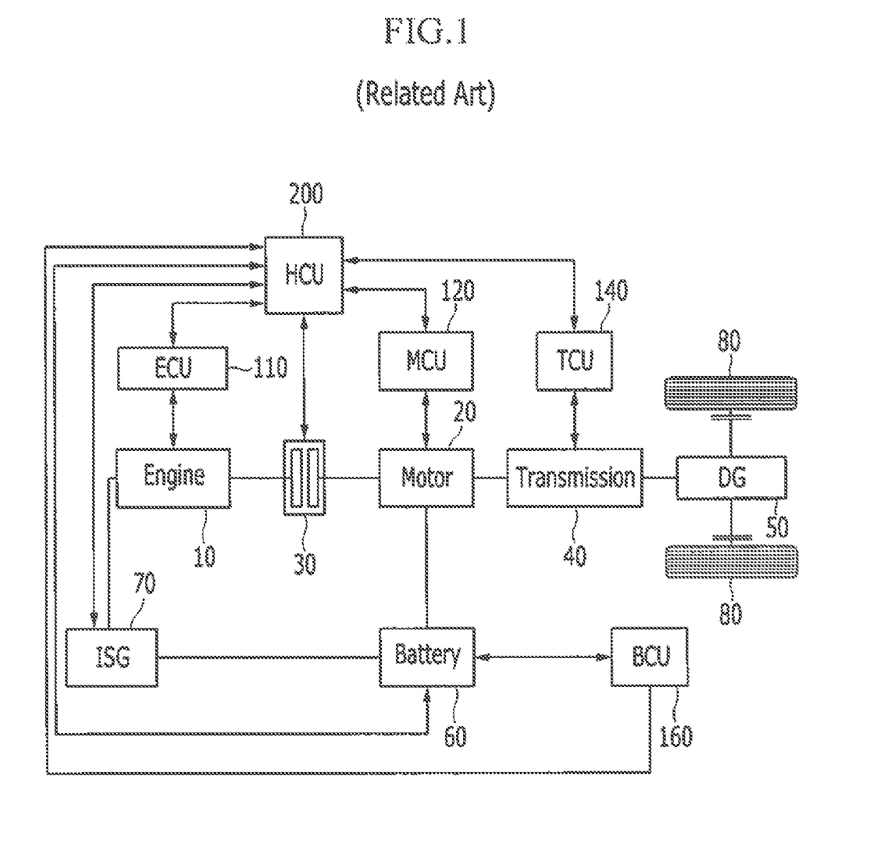
FIG. 1 is an exemplary diagram illustrating a configuration of a typical hybrid vehicle.

For example, as illustrated in FIG. 1, a typical hybrid vehicle includes: an engine 10; a motor 20; an engine clutch 30 which controls power transmission between the engine 10 and the motor 20; a transmission 40; a differential gear unit 50; a battery 60; an integrated starter-generator (ISG) 70 which starts the engine 10 or generates electric power by output of the engine 10; and wheels 80.

As further shown, the hybrid vehicle includes: a hybrid control unit (HCU) 200 which controls overall operation of the hybrid vehicle; an engine control unit (ECU) which controls operation of the engine 10; a motor control unit (MCU) 120 which controls operation of the motor 20; a transmission control unit (TCU) 140 which controls operation of the transmission 40; and a battery control unit (BCU) 160 which manages and controls the battery 60.

The battery control unit 160 may also be referred to as a battery management system (BMS). In the vehicle industry, the integrated starter-generator 70 may also be referred to as a starting/generating motor or a hybrid starter & generator.

The hybrid vehicle may run in a driving mode, such as an electric vehicle (EV) mode using only power of the motor 20, a hybrid electric vehicle (HEV) mode using torque of the engine 10 as main power and torque of the motor 20 as auxiliary power, and a regenerative braking (RB) mode during braking or when the vehicle runs by inertia. In the RB mode, braking and inertia energy are collected through power generation of the motor 20, and the battery 60 is charged with the collected energy.

The HEV mode and the EV mode depend on engagement or lock-up, or release or open of the engine clutch 30 installed between the engine 10 and the motor 20. In other words, the HEV mode is performed with an engagement state of the engine clutch 30, and the EV mode is performed with a release state of the engine clutch 30.

The engagement of the engine clutch 30 may include a sync engagement and a launch slip engagement.

Figure 2A:
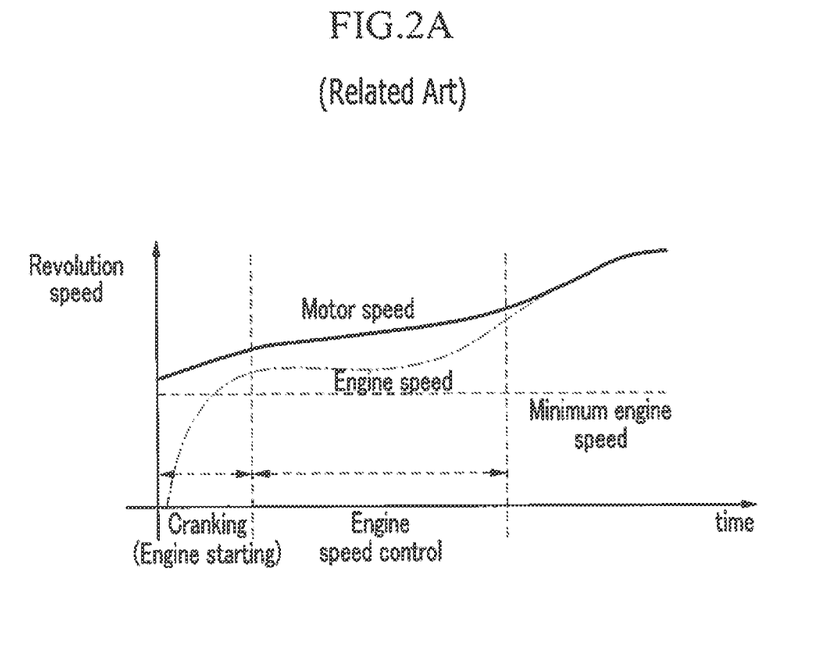
FIGS. 2A-C are exemplary graphs of revolution speed, engine clutch pressure and torque for explaining a sync engagement of an engine clutch of a typical hybrid vehicle.
Figure 2B:
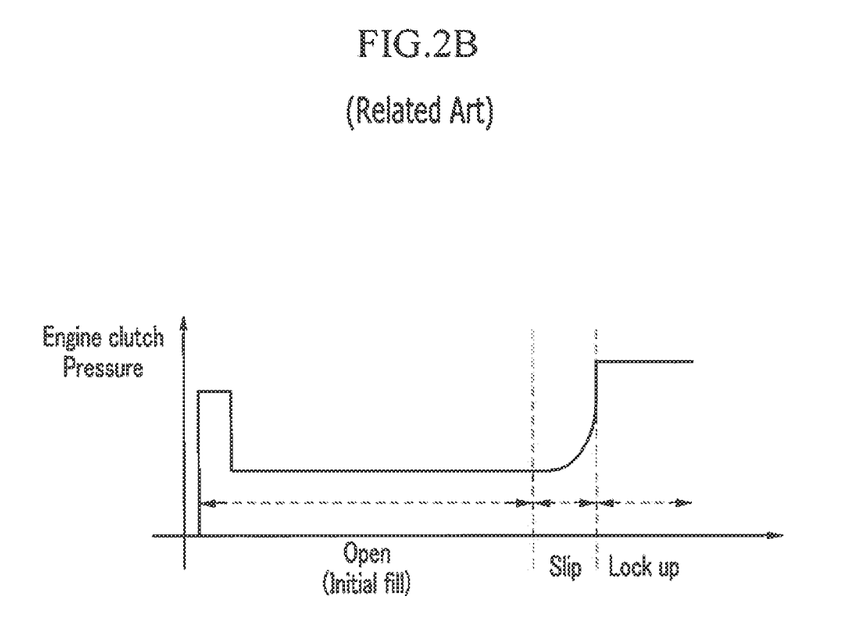
Figure 2C:
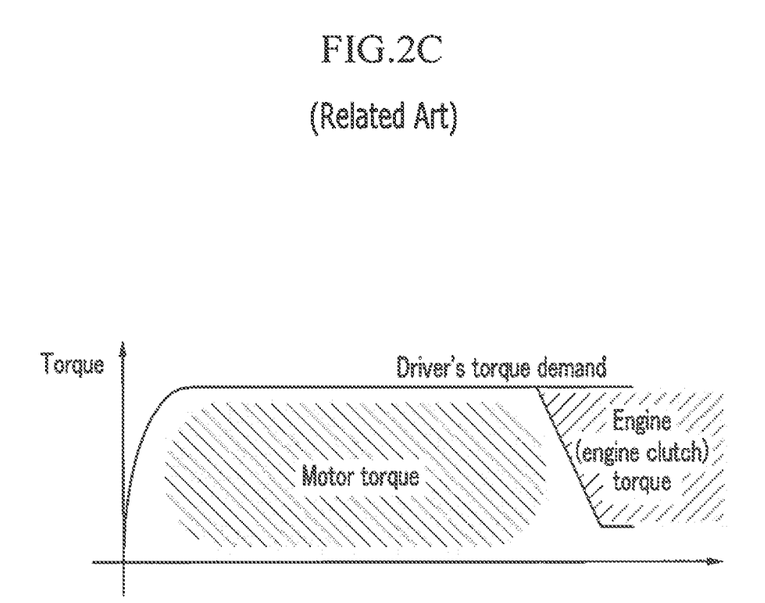

As shown in FIG. 2, the sync engagement is performed by engaging the engine clutch 30 after synchronizing speed of both ends of the engine clutch 30, or after synchronizing speed of the engine 10 with speed of the motor 20.

While performing the sync engagement, until the engine clutch 30 is completely engaged, the motor 20 covers power requested in the hybrid vehicle.

The sync engagement may not be performed at a low speed, because if the sync engagement of the engine clutch 30 is done when speed of the motor 20 is less than a minimum speed, such as a minimum idle speed of the engine 10, engine stall may occur.

Since the sync engagement is performed after synchronizing speed of both ends of the engine clutch 30, the sync engagement provides an advantage in terms of durability of the engine clutch 30.

Figure 3A:
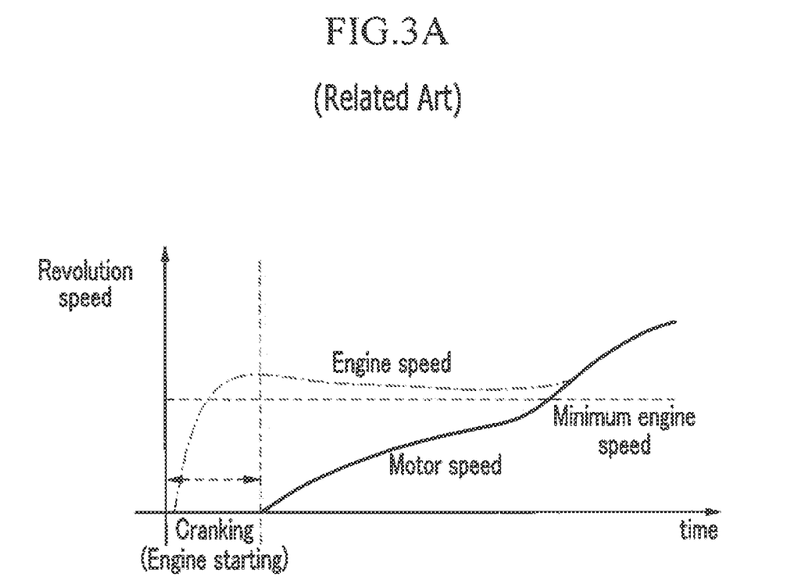
FIGS. 3A-C are exemplary graphs of revolution speed, engine clutch pressure and torque for explaining a launch slip engagement of an engine clutch of a typical hybrid vehicle.
Figure 3B:
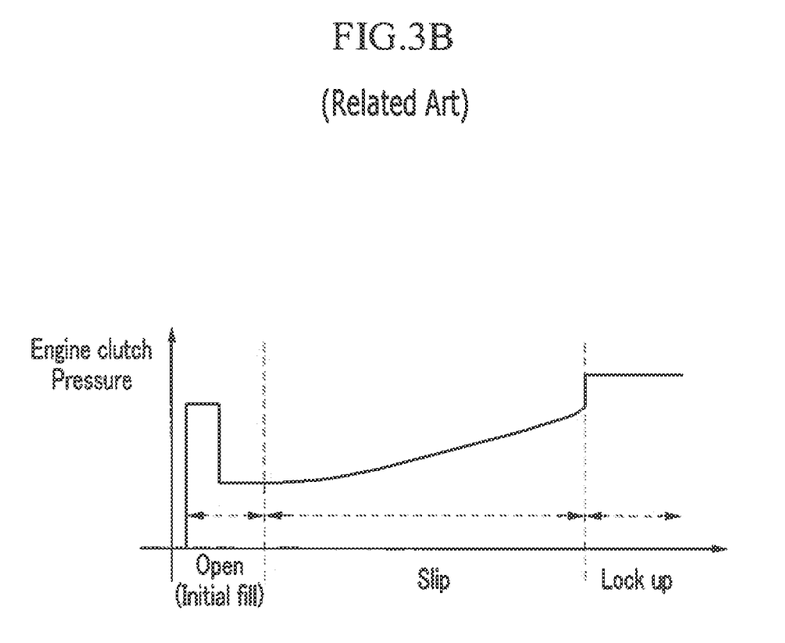
Figure 3C:
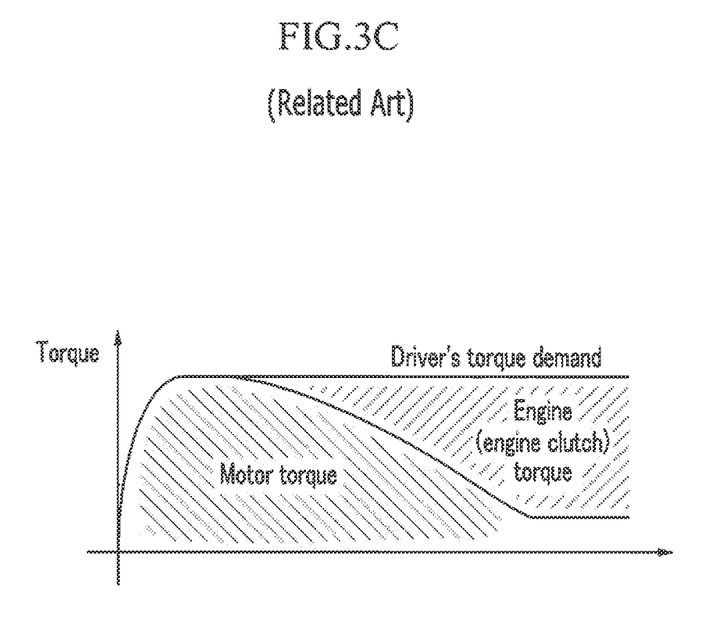

In the meantime, as shown in FIG. 3, the launch slip engagement is performed by supplying hydraulic pressure to the engine clutch 30 before speed of both ends of the engine clutch 30 is synchronized.

According to the launch slip engagement, slip torque may be transmitted as driving power before the engine clutch 30 is completely engaged.

As shown in FIG. 3, the launch slip engagement may be performed from when speed of the hybrid vehicle is low, for example, when the speed of the motor is 0.

Since the launch slip engagement generates more slip than the sync engagement, the launch slip engagement is not desirable in terms of durability of the engine clutch 30.

Further, while controlling the launch slip engagement, since compensation and correction for deviation and hydraulic pressure response and so on of the engine clutch 30 is needed, the launch slip engagement is inferior to the sync engagement in terms of drivability.

The sync engagement and the launch slip engagement are appropriately selected according to running state when the EV mode is changed to the HEV mode as running modes of the hybrid vehicle.

In a conventional hybrid vehicle, when the EV mode is changed to the HEV mode, if speed of the motor 20 is faster than speed of the engine 10, the sync engagement is performed. Otherwise, the launch slip engagement is performed.

In other words, in a conventional hybrid vehicle, even though it is possible to perform the sync engagement when the engine clutch is engaged, the launch slip engagement which is not desirable in durability and drivability is performed.

The above information disclosed in this Background section is only for enhancement of understanding of the background of the disclosure.

SUMMARY

The present disclosure provides a method and system for controlling an engine clutch of a hybrid vehicle having advantages of improving drivability, durability of the engine clutch, and management performance of a battery by differently selecting an engagement mode of the engine clutch according to a state of the hybrid vehicle and a running state.

In other words, the present disclosure provides a method and system for controlling an engine clutch of a hybrid vehicle having advantages of selecting a sync engagement or a launch slip engagement considering demand torque and usable power of a motor. An exemplary embodiment of the present disclosure provides a method of controlling an engine clutch that controls power transmission between an engine and a motor of a hybrid vehicle which includes, detecting a driver's demand torque; calculating a synchronization (sync) speed torque that the motor is able to output at a predetermined target speed for the sync engagement; detecting a state of charge (SOC) of a battery of the hybrid vehicle; calculating a charging torque of an integrated starter-generator (ISG) operated by power of the engine; performing a sync engagement when speed of the motor is greater than the predetermined target speed for the sync engagement, wherein the sync engagement engages the engine clutch after synchronizing speed of both ends of the engine clutch, and performing the sync engagement or a launch slip engagement based on the driver's demand torque, the sync speed torque of the motor, the SOC, and the charging torque when speed of the motor is less than the predetermined target speed for the sync engagement, wherein the launch slip engagement engages the engine clutch supplying hydraulic pressure before speed of both ends of the engine clutch is synchronized.

The predetermined target speed for the sync engagement may be set to be greater than the idle speed of the engine.

The performing the sync engagement or the launch slip engagement may include comparing the driver's demand torque with the sync speed torque of the motor, and performing the launch slip engagement when the driver's demand torque is greater than the sync speed torque.

The method may further include comparing the driver's demand torque with the charging torque of the motor when the driver's demand torque is less than the sync speed torque, and performing the sync engagement when the driver's demand torque is less than the charging torque.

The method may further include: determining whether the SOC is greater than a determined amount when the driver's demand torque is greater than the charging torque; determining whether acceleration of the hybrid vehicle is greater than a predetermined value when the SOC is greater than the determined amount; and performing the sync engagement when the acceleration of the hybrid vehicle is greater than the predetermined value.

The method may further include performing the launch slip engagement when the SOC is less than the determined amount.

The method may further include performing the launch slip engagement when the acceleration of the hybrid vehicle is less than the predetermined value.

The charging torque may be series charging as an amount of charging that may operate the motor to the predetermined target speed for the sync engagement.

Another embodiment of the present disclosure provides a system for controlling an engine clutch that controls power transmission between an engine and a motor of a hybrid vehicle, wherein the system includes a sync engagement that engages the engine clutch after synchronizing speed of both ends of the engine clutch and a launch slip engagement that engages the engine clutch supplying hydraulic pressure before speed of both ends of the engine clutch is synchronized, the system further including: an accelerator position sensor (APS) configured to detect a position of an accelerator pedal of the hybrid vehicle; an acceleration sensor configured to detect acceleration of the hybrid vehicle; an engine control unit (ECU) configured to control operation of the engine; a motor control unit (MCU) configured to control operation of the motor; a battery control unit (BCU) configured to manage and control a battery of the hybrid vehicle; an integrated starter-generator (ISG) configured to start the engine or to generate electric power by output of the engine and charge the battery with the electric power; and an engine clutch control unit configured to control engagement operation of the engine clutch based on each signal of said sensors and said control units, wherein the engine clutch control unit operates by a predetermined program that is set to perform a method of controlling an engine clutch of a hybrid vehicle according to an exemplary embodiment of the present disclosure.

As described above, according to an embodiment of the present disclosure, it may be possible to improve drivability, durability of the engine clutch, and management performance of a battery by differently selecting an engagement way of the engine clutch according to a state of the hybrid vehicle and a running state.

DETAILED DESCRIPTION

Hereinafter, an exemplary embodiment of the present disclosure will be described more fully with reference to the accompanying drawings. As will be evident, the described embodiments may be modified in various different ways, all without departing from the spirit or scope of the present disclosure.

Further, throughout the specification, like reference numerals refer to like elements.

FIG. 1 is an exemplary diagram schematically illustrating a hybrid vehicle to which a system for controlling an engine clutch according to an exemplary embodiment of the present disclosure may be applied.

As shown in FIG. 1, a hybrid vehicle to which a system for controlling an engine clutch according to an exemplary embodiment of the present disclosure may be applied may include: an engine 10; a motor 20; an engine clutch 30 configured to control power transmission between the engine 10 and the motor 20; a transmission 40; a differential gear unit 50; a battery 60; and an integrated starter-generator 70 configured to start the engine 10 or to generate electric power by output of the engine 10.

The hybrid vehicle may also include: a hybrid control unit (HCU) 200 configured to control overall operation of the hybrid electric vehicle; an engine control unit (ECU) 110 configured to control operation of the engine 10; a motor control unit (MCU) 120 configured to control operation of the motor 20; a transmission control unit (TCU) 140 configured to control operation of the transmission 40; and a battery control unit (BCU) 160 configured to manage and control the battery 60.

Figure 4:
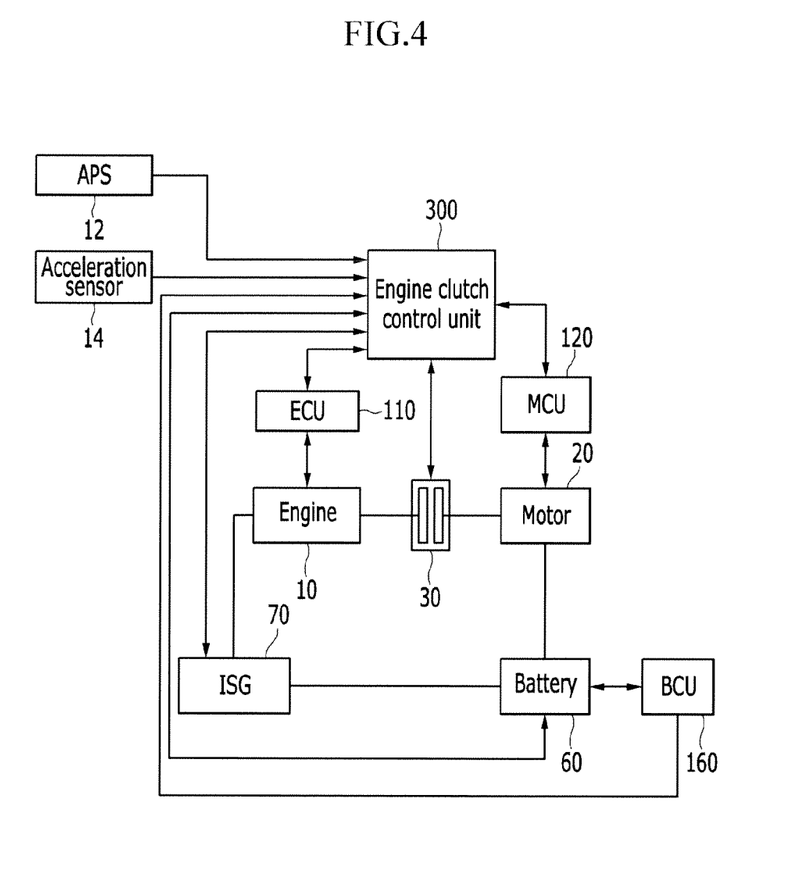
FIG. 4 is an exemplary diagram of a system that controls an engine clutch of a hybrid vehicle according to an exemplary embodiment of the present disclosure.

FIG. 4 is an exemplary diagram of a system that controls an engine clutch of a hybrid vehicle according to an exemplary embodiment of the present disclosure. The system shown in FIG. 4 may be a system that differently selects an engagement way of the engine clutch according to a state of the hybrid vehicle and a running state.

The system that controls the engine clutch of the hybrid vehicle may include: an accelerator position sensor (APS) 12 configured to detect a position of an accelerator pedal of the hybrid vehicle; an acceleration sensor 14 configured to detect acceleration of the hybrid vehicle; the engine control unit (ECU) 110 configured to control operation of the engine 10; the motor control unit (MCU) 120 configured to control operation of the motor 20; the battery control unit (BCU) 160 configured to manage and control the battery 60 of the hybrid vehicle; the integrated starter-generator (ISG) 70 configured to start the engine 10 or to generate electric power by output of the engine 10 and charge the battery 60 with the electric power; and an engine clutch control unit 300 configured to control engagement operation of the engine clutch 30 based on each signal of the sensors 12 and 14 and the ECU 110, MCU 120, and BCU 160.

In the exemplary embodiment of the present disclosure, for example, the APS 12 may be a sensor interlocked to an accelerator pedal to detect a position of the accelerator pedal, but it should be understood that the scope of the present disclosure is not essentially limited thereto. Other configurations capable of substantially detecting a signal corresponding to a position of the accelerator pedal may be used in the exemplary embodiment of the present disclosure in the same way as the APS 12.

The APS 12 detects a signal corresponding to a position of the accelerator pedal, and inputs the detected signal to the engine clutch control unit 300.

The acceleration sensor 14 may be a sensor that is generally applied to the hybrid vehicle to detect acceleration of the hybrid vehicle.

The APS 14 detects acceleration of the hybrid vehicle, and inputs a signal for the detected acceleration to the engine clutch control unit 300.

The ECU 110, the MCU 120, and the BCU 160 may correspond to those described in FIG. 1.

The engine clutch control unit 300 may include one or more processors or microprocessors and/or hardware operated by a predetermined program including a series of commands for executing a method of controlling an engine clutch of a hybrid vehicle according to an exemplary embodiment of the present disclosure, which will be described below.

In an exemplary embodiment of the present disclosure, for example, the engine clutch control unit 300 may include a hybrid control unit (HCU) 200 illustrated in FIG. 1, or may be included in a HCU 200, but it should be understood that the scope of the present disclosure is not essentially limited thereto. Other configurations capable of substantially selecting an engagement way of the engine clutch differently according to a state of the hybrid vehicle and a running state may be used in an exemplary embodiment of the present disclosure.

In a method of controlling an engine clutch of a hybrid vehicle according to an exemplary embodiment of the present disclosure which will be described below, some processes may be performed by the engine clutch control unit 300, other processes may be performed by the MCU 120, and yet further processes may be performed by the ECU 110 or the BCU 160.

However, it should be understood that the scope of the present disclosure is not limited to the exemplary embodiment to be described below. The control unit may be implemented with a different combination from that described in exemplary embodiments of the present disclosure. Further, the engine clutch control unit, the MCU 120, the ECU 110, and the BCU 160 may perform a different combination of processes from that described in exemplary embodiments of the present disclosure.

Hereinafter, a method of controlling an engine clutch of a hybrid vehicle according to an exemplary embodiment of the present disclosure will be described in detail with reference to the accompanying drawings.

In the sync engagement means, the engine clutch 30 is engaged after synchronizing speed of both ends of the engine clutch 30 which is installed between the engine 10 and the motor 20 of a typical hybrid vehicle.

In one exemplary embodiment of the present disclosure, in the launch slip engagement means, the engine clutch 30 is engaged by slip-controlling the engine clutch 30 before the speed of both ends of the engine clutch 30 is synchronized.

Figure 5:
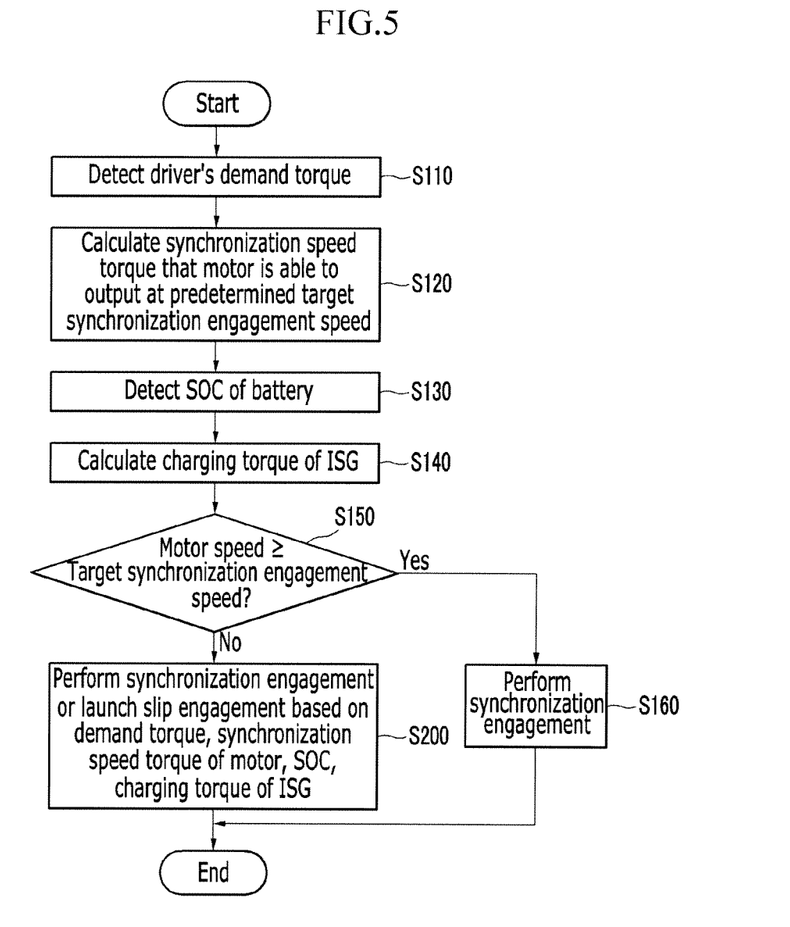
FIG. 5 and FIG. 6 are exemplary flowcharts of a method of controlling an engine clutch of a hybrid vehicle according to an exemplary embodiment of the present disclosure.
Figure 6:
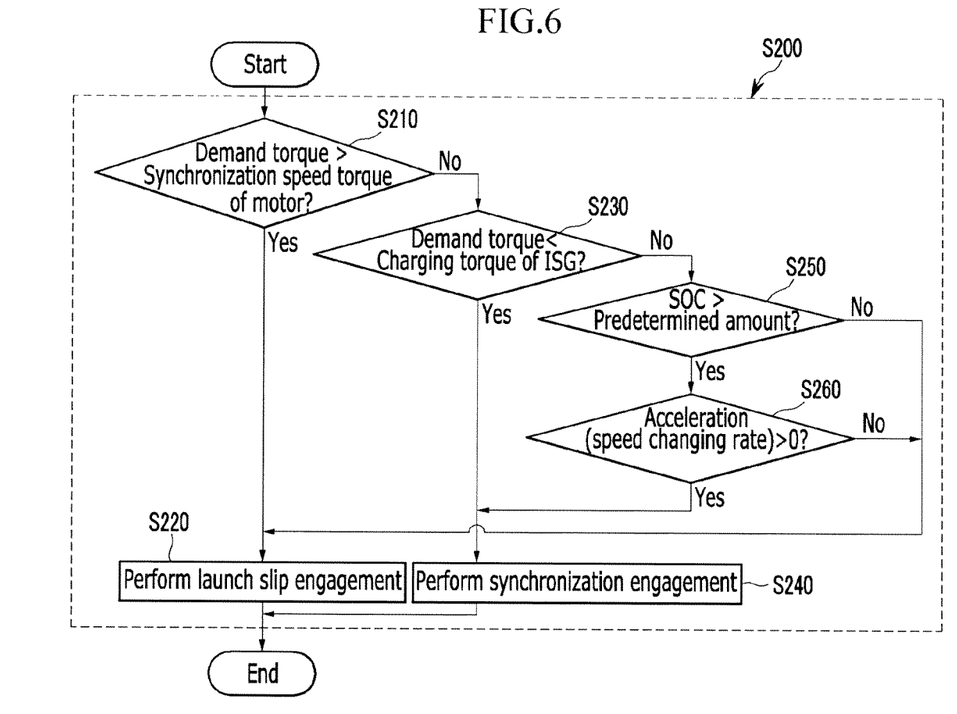

FIG. 5 and FIG. 6 are exemplary flowcharts of a method of controlling an engine clutch of a hybrid vehicle according to an exemplary embodiment of the present disclosure.

As shown in FIG. 5, the engine clutch control unit 300 detects a driver's demand torque at step S110.

The engine clutch control unit 300 may detect the driver's demand torque based on a signal from the APS 12.

After the engine clutch control unit 300 detects the driver's demand torque, the engine clutch control unit 300 calculates a sync speed torque of the motor 20 that the motor 20 is able to output at a predetermined target speed for the sync engagement at step 120.

The predetermined target speed for the sync engagement (target sync engagement speed) may be set to be greater than the idle speed of the engine 10. For example, the target sync engagement speed may be 1000 rpm.

Further, when the speed of the motor 20 is less than the target sync engagement speed, the engine clutch control unit 300 may calculate a sync speed torque that the motor 20 is able to output when the speed of the motor reaches the target sync engagement speed.

The engine clutch control unit 300 may calculate the sync speed torque based on signals from the ECU 110 and/or the MCU 120.

When the sync speed torque is calculated, the engine clutch control unit 300 detects an SOC of the battery at step S130.

The engine clutch control unit 300 may detect the SOC of the battery 60 using the BCU 160.

When the SOC of the battery 60 is detected, the engine clutch control unit 300 calculates charging torque of the ISG 70 that operates as a generator to charge the battery 60 while the engine clutch 30 is released, at step 140.

Since the charging torque of the ISG 70 corresponds to power to charge the battery 60, the charging torque may be referred to as series charging.

The series charging may be used as power to operate the motor 20 through the battery 60.

As described above, when the driver's demand torque, the sync speed torque, the SOC, and the charging torque are obtained, the engine clutch control unit 300 determines whether speed of the motor 20 is greater than the predetermined target speed for the sync engagement, at step 150.

When the speed of the motor 20 is greater than the predetermined target speed for the sync engagement at step 150, since the sync engagement is possible as in the related art described with reference to FIGS. 2A-C, the engine clutch control unit 300 performs the sync engagement at step 160.

However, when the speed of the motor 20 is less than the predetermined target speed for the sync engagement at step 150, although the launch slip engagement typically is unconditionally performed as described with reference to FIGS. 3A-C, the sync engagement and the launch slip engagement are selectively performed based on the driver's demand torque, the sync speed torque, the SOC, and the charging torque as described below at step S200.

FIG. 6 is a flowchart illustrating the selection performance of the sync engagement and the launch slip engagement S200 of FIG. 5 in detail.

When the speed of the motor 20 is less than the predetermined target speed for the sync engagement, the engine clutch control unit 300 determines whether the driver's demand torque is greater than the sync speed torque of the motor 20 at step S210.

Figure 7:
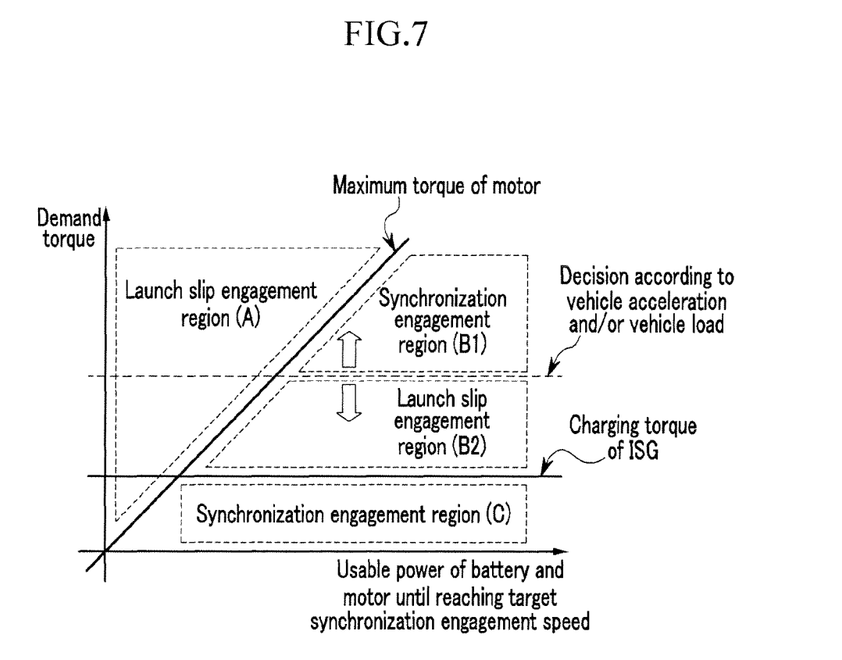
FIG. 7 is an exemplary graph for explaining operation of an exemplary embodiment of the present disclosure.

The driver's demand torque being greater than the sync speed torque of the motor 20 corresponds to the driver's demand torque in the launch slip engagement region (A) in FIG. 7, so in that case, the engine clutch control unit 300 performs the launch slip engagement at step S220.

When the driver's demand torque is less than the sync speed torque of the motor 20 at step S210, the engine clutch control unit 300 compares the driver's demand torque with the charging torque of the ISG 70 at step S230.

When the driver's demand torque is less than the charging torque of the ISG 70, this case corresponds to the sync engagement region (C) in FIG. 7, in other words, corresponds to sufficient supply of the series charging by the ISG 70, so the engine clutch control unit 300 performs the sync engagement at step S240.

When the driver's demand torque is greater than the charging torque of the ISG 70, the engine clutch control unit 300 determines whether the SOC of the battery 60 exceeds a predetermined amount, such as an amount of the battery that is able to increase the speed of the motor to the predetermined target speed for the sync engagement at step S250.

When the SOC of the battery 60 exceeds the predetermined amount, the engine clutch control unit 300 determines whether the acceleration or speed change rate of the hybrid vehicle is greater than the predetermined value, for example, 0, in other words, a positive number or a negative number, at step S260.

When the acceleration of the hybrid vehicle is greater than the predetermined value, or has the positive number, the engine clutch control unit 300 performs the sync engagement at step S240, which corresponds to the sync engagement region (B1) in FIG. 7.

The SOC of the battery 60 exceeding the predetermined amount corresponds to the speed of the motor 20 being increased to the predetermined target speed for the sync engagement by power of the battery 60.

The acceleration of the hybrid vehicle having a positive number corresponds to the hybrid vehicle being accelerated. As such, the SOC of the battery being fully discharged does not occur.

On the contrary, the acceleration of the hybrid vehicle being less than the predetermined value or has the negative number corresponds to deceleration of the hybrid vehicle, and if this state is maintained for some time, the battery may be fully discharged.

Therefore, when the acceleration of the hybrid vehicle is less than the predetermined value or has a negative number at step S250, the engine clutch control unit 300 performs the launch slip engagement at step S220, which corresponds to the launch slip engagement region (B2) in FIG. 7.

Accordingly, according to exemplary embodiments of the present disclosure, it is possible to effectively select an engagement way of the engine clutch according to a state of the hybrid vehicle and a running state even when the speed of the motor of the hybrid vehicle is less than the predetermined target speed for the sync engagement.

While this disclosure has been described in connection with what is presently considered to be practical exemplary embodiments, it is to be understood that the disclosure is not limited to the disclosed embodiments, but, on the contrary, is intended to cover various modifications and equivalent arrangements included within the spirit and scope of the appended claims.

What is claimed is:

1. A method for controlling an engine clutch that controls power transmission between an engine and a motor of a hybrid vehicle comprises:
   detecting a driver's demand torque;
   calculating a synchronization (sync) speed torque that the motor is able to output at a predetermined target speed for sync engagement;
   detecting a state of charge (SOC) of a battery of the hybrid vehicle;
   calculating a charging torque of an integrated starter-generator (ISG) operated by power of the engine;
   performing the sync engagement of the engine clutch when a speed of the motor is greater than the predetermined target speed for the sync engagement, in which the sync engagement engages the engine clutch after synchronizing speeds of both ends of the engine clutch; and
   selectively performing the sync engagement or launch slip engagement of the engine clutch based on the driver's demand torque, the sync speed torque of the motor, the SOC, and the charging torque when the speed of the motor is less than the predetermined target speed for the sync engagement,
   wherein the launch slip engagement engages the engine clutch by slip-controlling the engine clutch before the speeds of both ends of the engine clutch are synchronized, and
   wherein the step of selectively performing includes: comparing the driver's demand torque with the sync speed torque of the motor; and performing the launch slip engagement when the driver's demand torque is greater than the sync speed torque of the motor.

2. The method of claim 1, wherein the predetermined target speed for the sync engagement is set to be greater than an idle speed of the engine.

3. The method of claim 1, further comprising:
   comparing the driver's demand torque with the charging torque of the motor when the driver's demand torque is less than the sync speed torque; and
   performing the sync engagement when the driver's demand torque is less than the charging torque.

4. The method of claim 3, further comprising:
   determining whether the SOC is greater than a determined amount when the driver's demand torque is greater than the charging torque;
   determining whether an acceleration of the hybrid vehicle is greater than a predetermined value when the SOC is greater than the determined amount; and
   performing the sync engagement when the acceleration of the hybrid vehicle is greater than the predetermined value.

5. The method of claim 4, further comprising
   performing the launch slip engagement when the SOC is less than the determined amount.

6. The method of claim 4, further comprising
   performing the launch slip engagement when the acceleration of the hybrid vehicle is less than the predetermined value.

7. The method of claim 1, wherein the charging torque is series charging as a charging amount to operate the motor to the predetermined target speed for the sync engagement.

8. A system for controlling an engine clutch that controls power transmission between an engine and a motor of a hybrid vehicle, wherein the system controls synchronization (sync) engagement that engages the engine clutch after synchronizing speeds of both ends of the engine clutch and launch slip engagement that engages the engine clutch by slip-controlling the engine clutch before the speeds of both ends of the engine clutch are synchronized, the system comprising:
- an accelerator position sensor (APS) configured to detect a position of an accelerator pedal of the hybrid vehicle;
- an acceleration sensor configured to detect an acceleration of the hybrid vehicle;
- an engine control unit (ECU) configured to control operation of the engine;
- a motor control unit (MCU) configured to control operation of the motor;
- a battery control unit (BCU) configured to manage and control a battery of the hybrid vehicle;
- an integrated starter-generator (ISG) configured to start the engine or generate electric power by an output of the engine and to charge the battery with the electric power; and
- an engine clutch control unit configured to control engagement operation of the engine clutch based on each signal of said sensors and said control units,
- wherein the engine clutch control unit is operated by a predetermined program, and the predetermined program includes a series of commands for executing functions of controlling an engine clutch, the functions comprising:
- detecting a driver's demand torque;
- calculating a sync speed torque that the motor is able to output at a predetermined target speed for the sync engagement;
- detecting a state of charge (SOC) of the battery of the hybrid vehicle;
- calculating a charging torque of the integrated starter-generator (ISG) operated by power of the engine;
- performing the sync engagement of the engine clutch when a speed of the motor is greater than the predetermined target speed for the sync engagement; and
- selectively performing the sync engagement or the launch slip engagement of the engine clutch based on the driver's demand torque, the sync speed torque of the motor, the SOC, and the charging torque when the speed of the motor is less than the predetermined target speed for the sync engagement,
- wherein the step of selectively performing includes comparing the driver's demand torque with the sync speed torque of the motor; and performing the launch slip engagement when the driver's demand torque is greater than the sync speed torque.

9. The system of claim 8, wherein the predetermined target speed for the sync engagement is set to be greater than an idle speed of the engine.

10. The system of claim 8, further comprising:
- comparing the driver's demand torque with the charging torque of the motor when the driver's demand torque is less than the sync speed torque; and
- performing the sync engagement when the driver's demand torque is less than the charging torque.

11. The system of claim 10, further comprising:
- determining whether the SOC is greater than a determined amount when the driver's demand torque is greater than the charging torque;
- determining whether the acceleration of the hybrid vehicle is greater than a predetermined value when the SOC is greater than the determined amount; and
- performing the sync engagement when the acceleration of the hybrid vehicle is greater than the predetermined value.

12. The system of claim 11, further comprising performing the launch slip engagement when the SOC is less than the determined amount.

13. The system of claim 11, further comprising performing the launch slip engagement when the acceleration of the hybrid vehicle is less than the predetermined value.

14. The system of claim 8, wherein the charging torque is series charging as a charging amount to operate the motor to the predetermined target speed for the sync engagement.

* * * * *